United States Patent [19]

Teraichi et al.

[11] Patent Number: 4,916,607
[45] Date of Patent: Apr. 10, 1990

[54] COMPUTER FOR EXECUTING A PROCESS CONTROL PROGRAM AND A COMMUNICATION CONTROL PROGRAM IN PARALLEL

[75] Inventors: Hiroo Teraichi, Fujisawa; Naoshi Inoue, Tokyo; Yoji Furuya, Inagi; Shigehiro Kadota, Kawasaki, all of Japan

[73] Assignee: Canon Kabushiki Kaisha, Tokyo, Japan

[21] Appl. No.: 103,304

[22] Filed: Oct. 1, 1987

[30] Foreign Application Priority Data

Oct. 2, 1986 [JP] Japan .................. 61-235951

[51] Int. Cl.$^4$ ............... G06F 9/06; H04M 11/00
[52] U.S. Cl. ................ 364/200; 364/222.2; 364/238.5; 379/98; 379/100
[58] Field of Search ............ 364/200, 900; 379/98, 379/100; 358/257

[56] References Cited

U.S. PATENT DOCUMENTS

| | | | |
|---|---|---|---|
| 3,821,705 | 6/1974 | Chertok et al. | 379/98 |
| 4,353,097 | 10/1982 | Takeda et al. | |
| 4,421,951 | 12/1983 | Van Bosse | 379/98 |
| 4,516,200 | 5/1985 | Thompson | 364/200 |
| 4,539,435 | 9/1985 | Eckmann | 379/97 |
| 4,578,537 | 3/1986 | Faggin et al. | 379/93 |
| 4,596,021 | 6/1986 | Carter et al. | 379/98 |
| 4,677,660 | 6/1987 | Yoshida . | |
| 4,773,080 | 9/1988 | Nakajima et al. | |
| 4,800,439 | 1/1989 | Yoshino . | |
| 4,815,121 | 3/1989 | Yoshida . | |

*Primary Examiner*—Gareth D. Shaw
*Assistant Examiner*—Debra A. Chun
*Attorney, Agent, or Firm*—Fitzpatrick, Cella, Harper & Scinto

[57] ABSTRACT

A personal computer system with communication function, in which the operating mode is automatically controlled by a tone signal transmitted through a communication channel.

14 Claims, 6 Drawing Sheets

COMPUTER FOR EXECUTING A PROCESS CONTROL PROGRAM AND A COMMUNICATION CONTROL PROGRAM IN PARALLEL

BACKGROUND OF THE INVENTION

1. Field of the Invention

The present invention relates to a personal computer equipped with a communication function.

2. Related Background Art

In the above-mentioned technical field, there is already known for example, a personal computer with a facsimile communication function.

In such a conventional personal computer facsimile system, the facsimile communication and the telephone communication are manually selected by the operator. Also a facsimile apparatus generally has an automatic reception mode and a manual reception mode, and in the automatic mode, there is only achieved an automatic facsimile reception in response to a call from the communication line.

For this reason, if the operator is absent or the apparatus is set to the facsimile reception mode, another station wishing communication is unable to select a telephone communication or a facsimile communication.

Also in case of communication control by a computer, the computer cannot be used for other tasks during communication. A data communication apparatus with an automatic answering telephone function is disclosed in U.S. patent application Ser. No. 014,387 filed Feb. 13, 1987, entitled "DATA COMMUNICATION APPARATUS" which is now U.S. Pat. No. 4,800,439 and U.S. patent application Ser. No. 037,956 filed Apr. 13, 1987, entitled "COMMUNICATION APPARATUS", now abandoned in favor U.S. patent application Ser. No. 403,842 filed Sept. 5, 1989.

SUMMARY OF THE INVENTION

An object of the present invention is to provide an improvement on a computer having a communication function.

Another object of the present invention is to eliminate the above-mentioned drawbacks.

Still another object of the present invention is to provide a computer having plural modes and capable of mode control in response to a tone signal from a communication line.

Still another object of the present invention is to enable, in a computer having a data communication function and acoustic data communication function, mode setting in response to a tone signal from a communication line.

Still another object of the present invention is to provide a computer capable of automatic switching its operating mode, thereby enabling another station to arbitrarily select telephone communication or data transmission.

Still another object of the present invention is to provide a computer capable of effectively utilizing a data communication function and an acoustic communication function.

Still other objects of the present invention will become fully apparent from the following description of the preferred embodiments.

DETAILED DESCRIPTION OF THE PREFERRED EMBODIMENTS

Now the present invention will be clarified in detail by an embodiment thereof, shown in the appended drawings.

Figure 1:
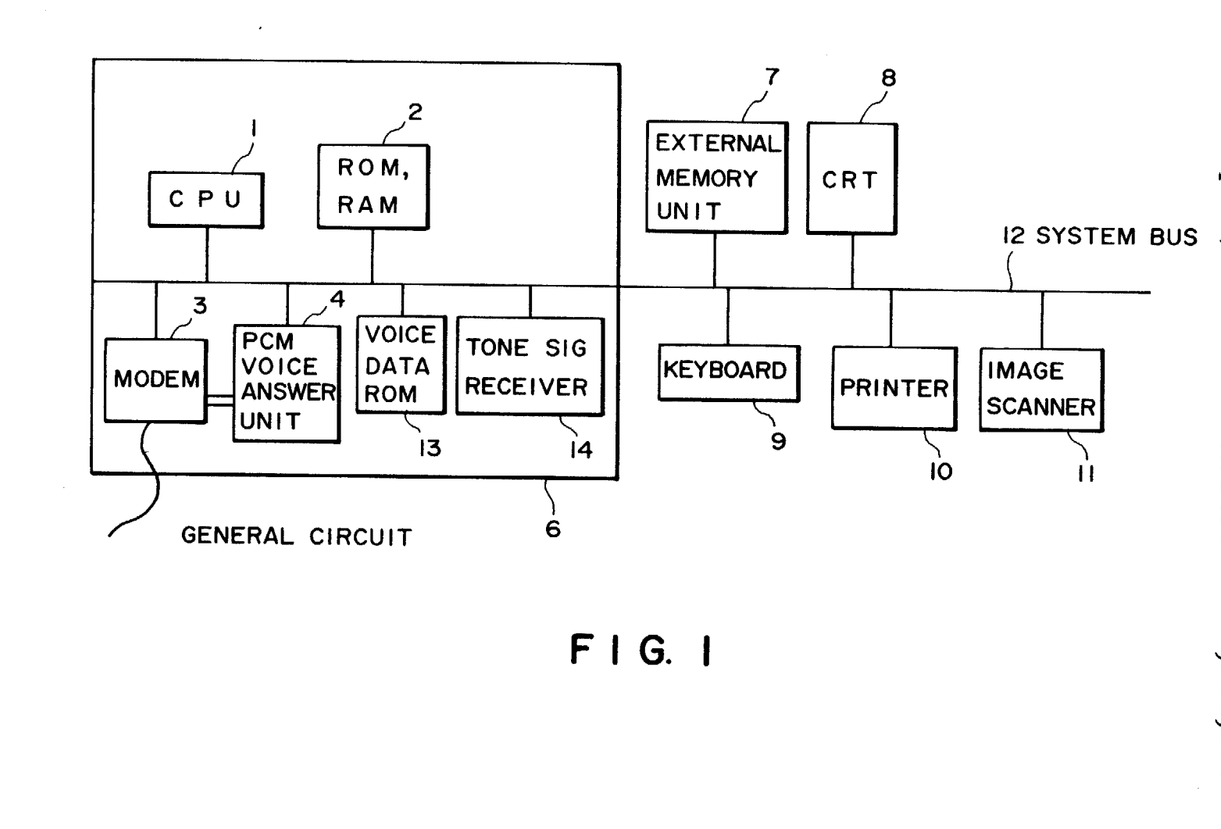
FIG. 1 is a block diagram of an embodiment of the present invention.
Figure 2:
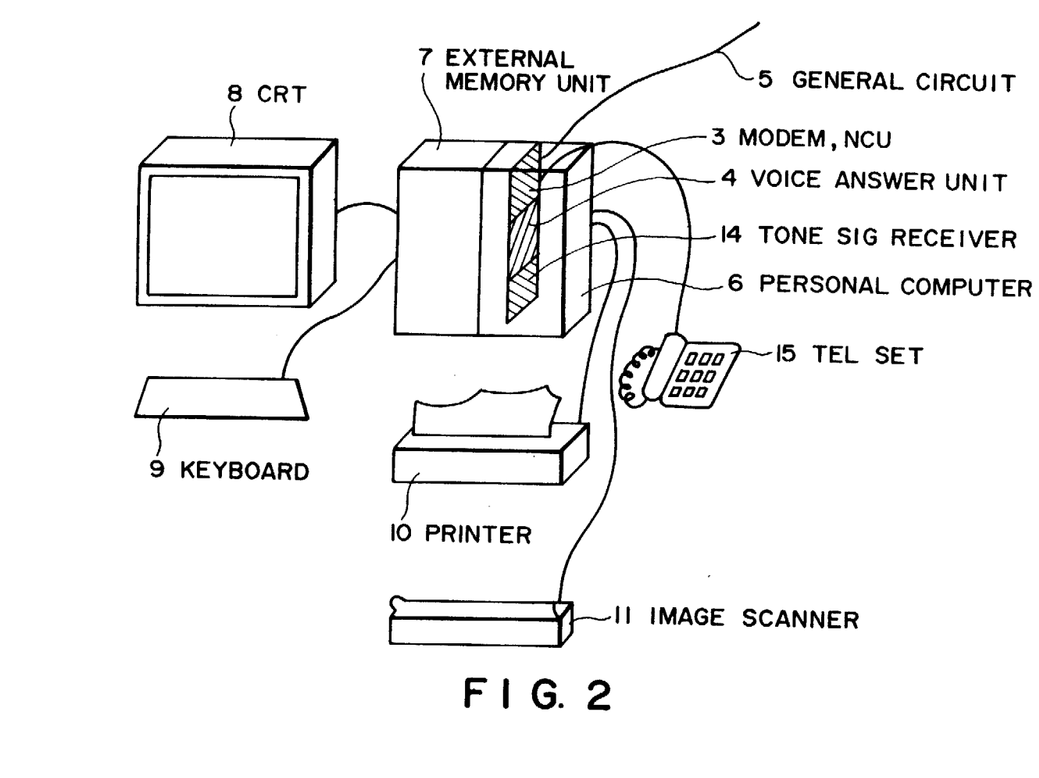
FIG. 2 is an external view of a personal computer facsimile system with an acoustic response function of the embodiment.

FIG. 1 is a block diagram of a personal computer facsimile system with an acoustic response function, constituting an embodiment of the present invention, and FIG. 2 is an external view of the system.

In FIG. 1 there are shown:

a CPU 1 for controlling the present system;

a memory 2 comprising a read-only memory (ROM) storing a control program of the CPU and a random access memory (RAM) for storing data;

a modem 3 for demodulating signals from a public communication line 5 and modulating data to be transmitted;

an already known PCM acoustic response unit 4 for converting PCM digitized acoustic data into analog signal for acoustic output;

an acoustic data ROM 13 storing acoustic data digitized by pulse code modulation (PCM); and a tone signal receiving unit 14 for receiving tone dial signals, for example, used in a push-button telephone unit.

The personal computer 6 of the present embodiment is composed of the CPU 1; ROM/RAM 2; modem 3; PCM acoustic response unit 4; acoustic data ROM 13 and tone signal receiving unit 14.

There are further shown:

an external memory unit 7 such as a floppy disk or a magnetic disk;

a cathode ray tube (CRT) 8 for data display;

a keyboard 9 for data entry and system operation;

a printer 10 for data output; and an image scanner 11 for reading an original document.

The above-mentioned units 1-11 are connected to a system bus 12, and controlled by the CPU 1.

Figure 3:
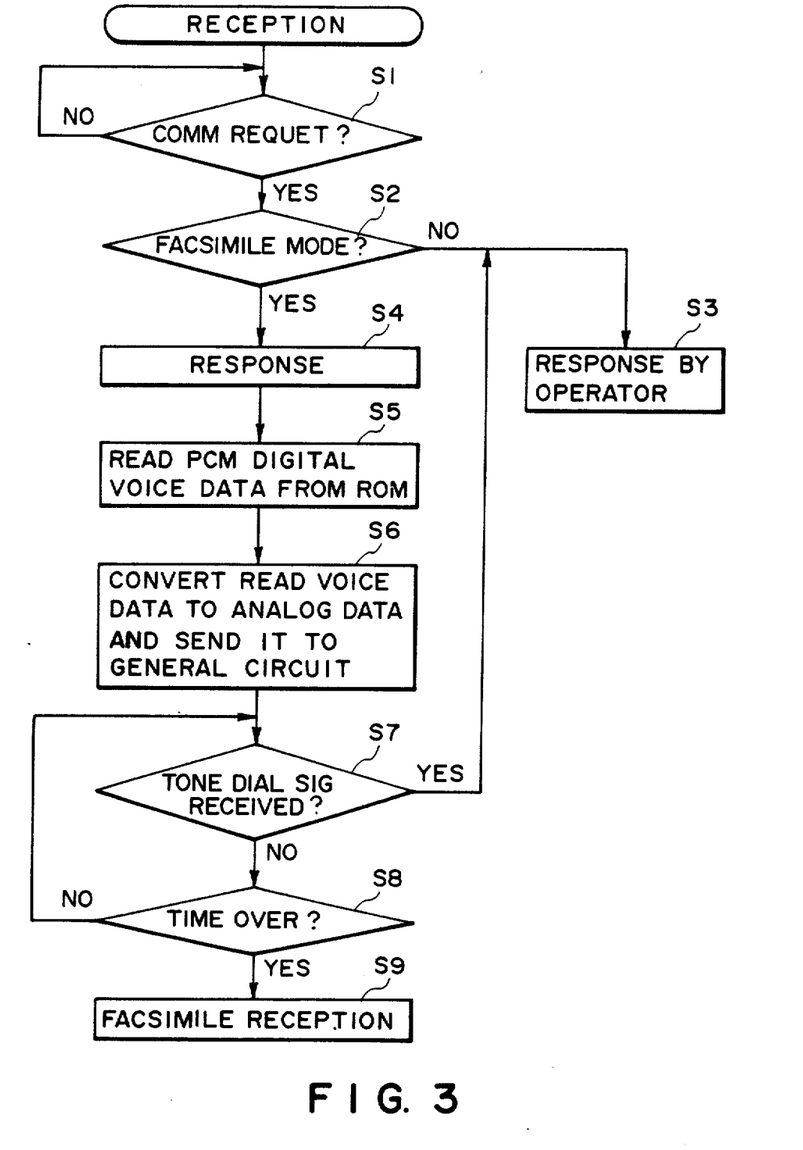
FIG. 3 is a flow chart showing the control sequence of a CPU 1 of the system.

Now reference is made to a flow chart shown in FIG. 3, for explaining the control procedure of the CPU 1 in the present embodiment.

At first a step S1 discriminates the presence of a communication request signal from the public line 5, and the sequence proceeds to a step S2 if the signal is discriminated to be present.

A step S2 discriminates whether the present system is set to a facsimile mode, and, if not, a step S3 awaits a telephone response by the operator. In this case, an acoustic response is therefore made by the operator. On the other hand, if the facsimile mode is identified in the step S2, a step S4 transmits a facsimile response signal to the public line 5.

Then, in order to indicate the facsimile reception mode of this system and to identify this system, a step S5 reads acoustic message data such as "This is XXXXX, now in the facsimile reception mode" from the acoustic data ROM 13 and temporarily stores the data in the RAM of the ROM, RAM 2.

Then, in a step S6, the PCM acoustic response unit 4 converts the acoustic data stored in the RAM into analog signals and transmits the signals as a voice message to the public line 5.

Then steps S7 and S8 discriminate whether the tone signal receiving unit 14 has received predetermined tone dial signals of push buttons within a predetermined period, and, if received, a step S3 calls the operator by a buzzer sound or by a telephone unit 15 to await the acoustic response by the operator.

On the other hand, if the predetermined tone signals have not been received within the predetermined period in the steps S7, S8, then a step S9 executes facsimile reception.

As explained above, if the present system receives a communication request from the public line while it is set to the facsimile reception mode, it makes a facsimile response and then sends acoustic data indicating the name of the system and that the system is in the facsimile reception mode. Therefore, if a station requesting communication wishes telephone communication, predetermined tone dial signal are sent by push buttons to switch the present system from the facsimile reception mode to the telephone mode.

In the foregoing explanation the digitized acoustic data are stored in the acoustic ROM 13, but the PCM digitized acoustic data may be stored in the external memory 7.

In the following there will be explained the method of pulse code modulation. Acoustic analog signals are generally represented by signals of predetermined frequencies, and can be converted into digital acoustic signals by sampling the amplitude of the frequencies at a predetermined interval and digitizing the thus sampled amplitude. The analog acoustic signal can be regenerated from the digital acoustic signals, by reproducing the frequencies from the amplitudes of a predetermined interval.

In the present embodiment, acoustic data digitized by PCM process are stored in the memory, but require a considerably large memory capacity. It is however possible to reduce the amount of digital acoustic data and to correspondingly reduce the memory capacity by the adaptive differential pulse code modulation (ADPCM) in which the amount of change in amplitude is digitized at every predetermined interval.

Figure 4:
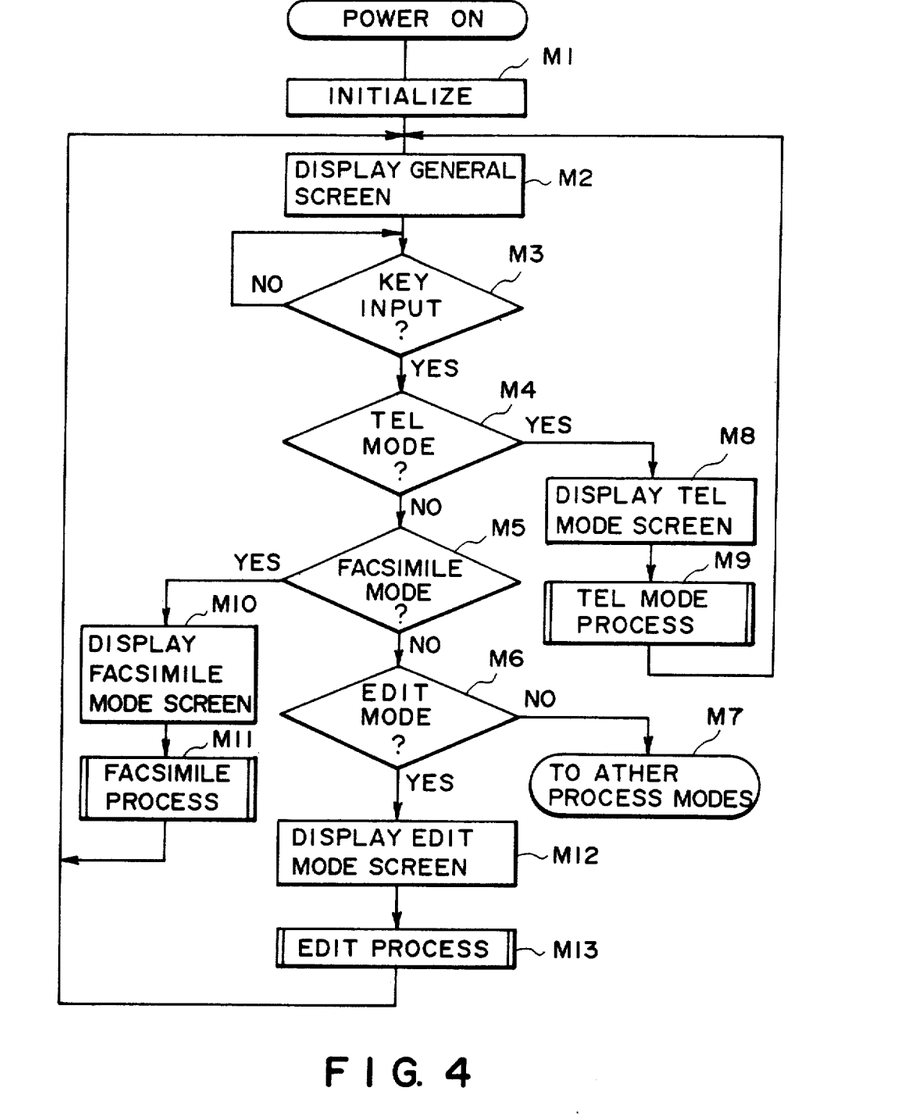
FIG. 4 is a flow chart showing a mode process of the CPU 1.

In the following there will be given an explanation on the function of the personal computer of the present embodiment, while making reference to a flow chart shown in FIG. 4, showing the control sequence of the CPU 1.

When a basic program is started by the turning on of power supply, a step M1 executes an initialization, and a step M2 stores information of a standard frame for mode selection by the operator in a video RAM (VRAM) of the cathode ray tube 8, thereby displaying the standard frame on the cathode ray tube 8. Then a step M3 awaits a key input through the keyboard 9 by the operator, and, in response to a key input, steps M4, M5, M6 and M7 discriminate whether the key input has selected the telephone mode, the facsimile mode, the document preparation mode or another process mode.

If the key input of the operator has selected the telephone mode, the sequence proceeds from the step M4 to M8 to store the information of a telephone mode frame in the VRAM of the cathode ray tube 8, thereby displaying the telephone mode frame thereon, and, in response to key inputs by the operator through the keyboard 9, a step M9 executes telephone mode processes, including dialing (including re-dialing), search and registration of a telephone number, communication control (for example on-hook communication), setting of automatic response (setting of response message, setting of recording etc.), confirmation of recorded message, etc.

If the key input has selected the facsimile mode, the sequence proceeds from the step M5 to M10 to store the information of a facsimile mode frame in the VRAM of the cathode ray tube 8, thereby displaying the facsimile mode frame thereon, and, in response to key inputs by the operator through the keyboard 9, a step M11 executes facsimile mode processes, including dialing, facsimile mode selection, the process of reading an image and storing it in the external memory 7, image transmission, etc.

If the key input has selected the document preparation mode, the sequence proceeds from the step M6 to M12 to store the information of a document preparation mode frame in the VRAM of the cathode ray tube 8, thereby displaying the document preparation mode frame thereon, and, in response to the key inputs by the operator through the keyboard 9, a step M13 executes document preparation mode processes, including document preparation by the keyboard 9, printing of a prepared document, storage of a prepared document in the external memory 7, synthesis of an image read by the image scanner 11 and a document prepared by the keyboard 9, editing or printing of document data read from the external memory 7, etc.

After the execution of the process in various modes as explained above, the personal computer of the present embodiment enters a stand-by state in the steps M2 and M3.

Figure 5:
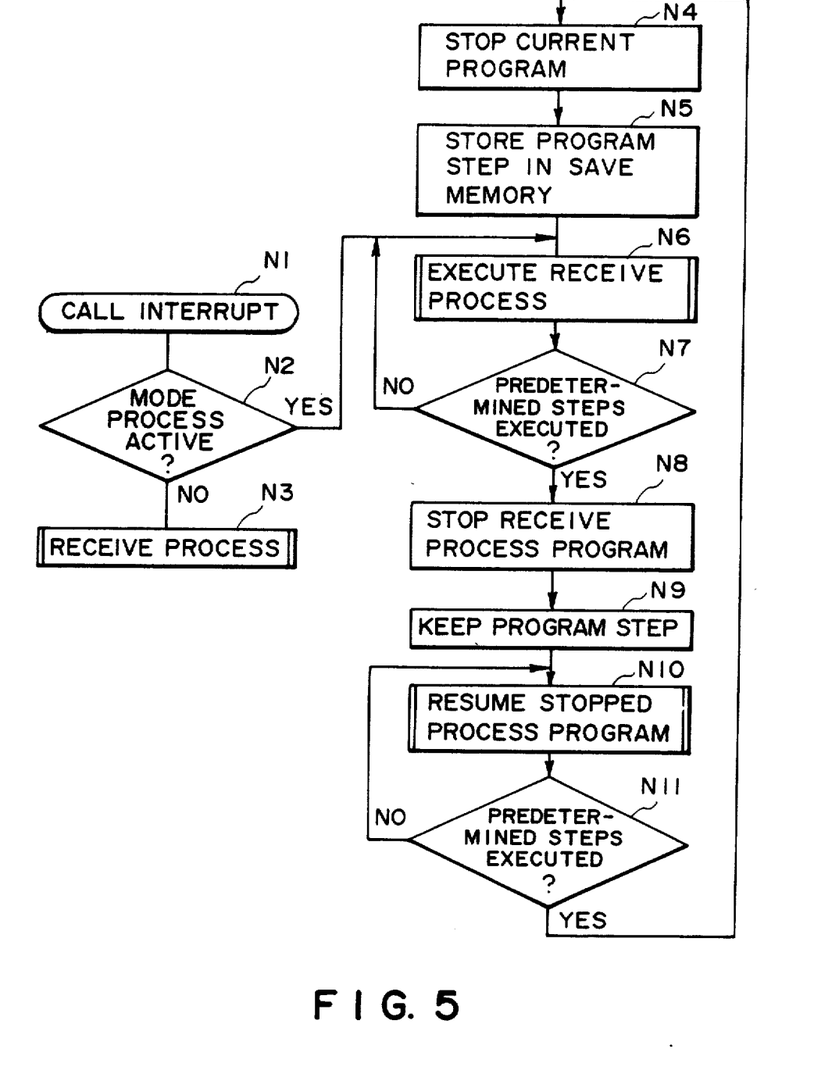
FIG. 5 is a flow chart of an interruption procedure initiated by a call signal.

If a call signal Ci is detected by the modem NCU in the course of execution of the program of the above-mentioned various modes, in response to a detection signal from the modem, the CPU 1 interrupts the program under execution, stores the step under execution in a first save memory for interruption of the CPU 1, and executes a call/interruption program shown in FIG. 5, which will be explained in the following.

At first a step N1 starts the execution of the interruption program, and a step N2 discriminates whether the CPU was executing the program of a mode or was in the stand-by state when the interruption was requested, by reading the ROM address of the program step in the save memory of the CPU 1. When the step N2 identifies the mode program execution, the sequence proceeds to a step N6, but, when the step N2 identifies the stand-by state, the sequence proceeds to a step N3 to execute the program of a reception process, shown in FIG. 3.

When the step N2 identifies the program execution, the step N6 executes the reception program, and a step N7 discriminates whether predeteremined steps of the program have been executed. If executed, a step N8 terminates the execution of the reception program, then a step N9 stores the step under execution of the reception program into a second save memory of the CPU 1, and a step N10 sets the program step stored in the first save memory into the program counter of the CPU 1, thereby re-starting the execution of the interrupted mode program. Then, when a step N11 identifies the execution of predetermined steps of the mode program, the sequence proceeds to a step N4 for interrupting the execution of the mode program, and a step N5 for storing the program step of the program counter of the CPU 1 into the first save memory. Then the step N6 again sets the program step of the reception program stored in the second save memory into the program counter of the CPU 1, thereby executing the reception program.

As explained above, if a signal Ci from the communication line is detected during the execution of a mode program, the mode program and the reception program are alternately executed by a predetermined number of steps, so that these two programs are executed in a parallel manner. Consequently the personal computer of the present embodiment can execute the reception program even in the course of execution in various modes, without affecting the execution.

In the following there will be explained, as another embodiment, a reception process having an acoustic recording mode.

Figure 6:
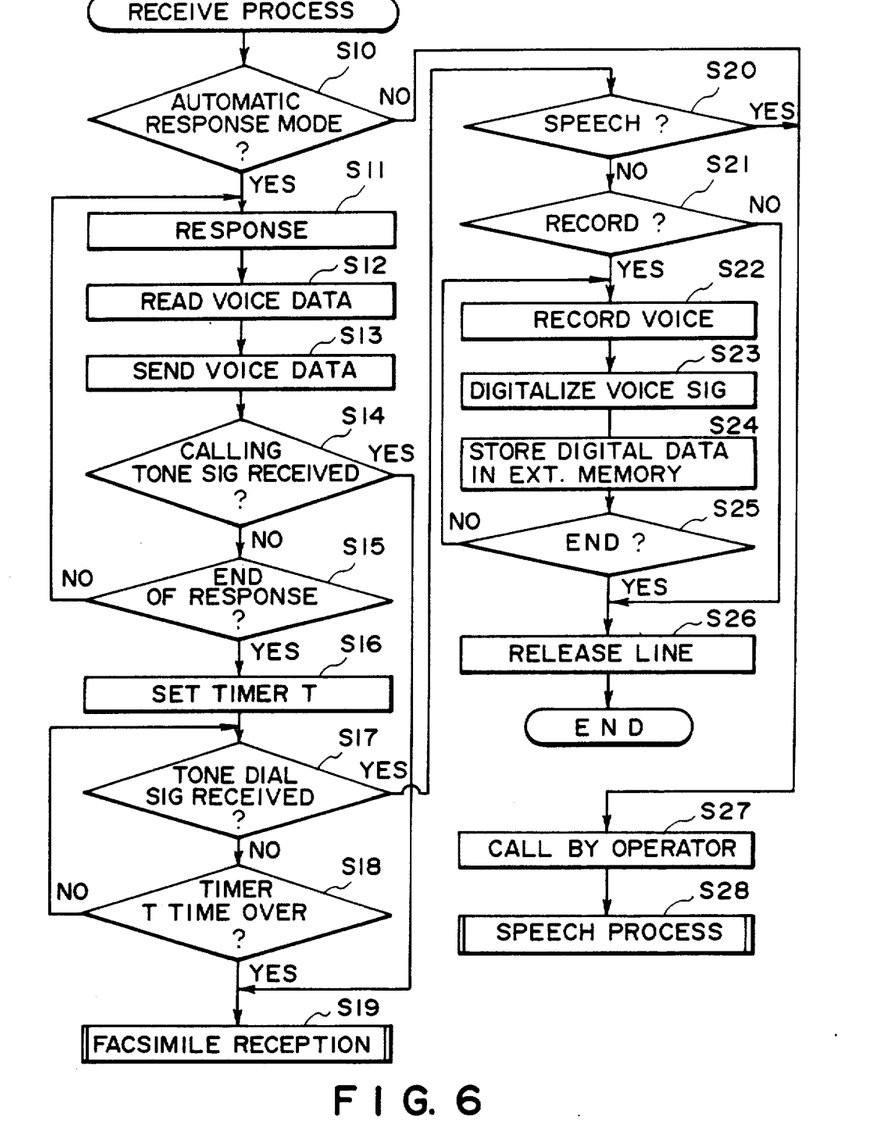
FIG. 6 is a flow chart of a reception process of another embodiment.

FIG. 6 is a flow chart showing a reception sequence of the CPU 1 in the another embodiment. The sequence is also executed in response to a request for interruption of the CPU 1, in the same manner as in the case of FIG. 3.

At first a step S10 discriminates whether an automatic response mode has been set. The mode is to be selected by the operator through a key input of the keyboard 9, and, in response to the mode setting, an auto response flag is set in the RAM 2 and is detected in the step S10. If the step S10 identifies the auto response mode, the sequence proceeds to a step S11. On the other hand, if the auto response mode has not been set, the sequence proceeds to a step S27 for calling the operator, indicating the presence of a call from the communication line. The operator call is made by a tone generator, but it may be done by a combination of tone and display or by display only, according to the selection of the operator. Then a step S28 executes a telephone communication process.

In case of the auto response mode, the step S11 responds to the call, then a step S12 reads the acoustic response data stored in the external memory 7, and a step S13 converts the data into acoustic signals by the acoustic response device and sends the signals to the communication line through the modem NCU 3. Then a step S14 discriminates whether a call tone signal CNG has been received from the communication line through the modem NCU, and, if received, the sequence proceeds to a step S19. On the other hand, if not received, the sequence proceeds to a step S15 for discriminating whether the acoustic response has been terminated. The steps S11 to S13 are repeated in this manner, and, upon termination of the acoustic response, the sequence proceeds from the step S15 to S16 for setting an internal timer T of the CPU 1. Then steps S17 and S18 discriminate whether a tone dial signal has been received from the communication line through the modem NCU 3 before the expiration of the timer T, and, if not received, the sequence proceeds to a step S19 for executing the facsimile reception. On the other hand, if the tone dial signal has been received before the expiration of the timer T, the sequence proceeds from the step S17 to S20 for discriminating whether the received tone dial signal indicates a telephone communication, and, if so in the step S20, the sequence proceeds to the step S27. If not, a step S21 discriminates whether the received tone dial signal indicates recording, and, if so, a step S22 receives the acoustic signals. Then a step S23 converts, by the acoustic response device 4, the acoustic signals from the communication line into digital data by PCM, then a step S24 stores thus converted acoustic digital data into an acoustic message area of the external memory 7, and the steps S22 to S25 are repeated until the step S25 identifies the completion of acoustic recording, whereupon a step S26 releases the communication line.

On the other hand, if the tone dial signal received from the communication line does not indicate telephone communication or recording, the sequence proceeds to the step S26 from the step S21.

In the above-explained procedure, the steps S11–S15 can for example send a message "This is xxxxx, now going out. If you have a message, please push key xx. If you wish to send a facsimile message, please push transmission button", and the caller can arbitrarily select the acoustic recording or the facsimile transmission. If the caller still wishes a telephone communication, the caller can send a tone dial signal indicating the telephone communication, whereby the system is shifted to the telephone communication mode. The mode setting signal is not limited to such tone dial signal but can be a dial pulse signal.

The foregoing embodiments enables to effect a reception process even in the course of execution of another process, and enables the other station to select one of plural modes.

Also the mode process of the personal computer is not limited to that explained above, but other modes such as calculation mode or schedule administration mode may be added.

Furthermore the present invention is not limited to the foregoing embodiments but is subject to various modifications.

What is claimed is:

1. A computer, comprising:
  process means for effecting a data process;
  means for effecting data communication through a communication line;
  means for effecting voice message communication through the communication line;
  means for detecting a request for communication from the communication line;
  a memory storing both a program from controlling said process means and a program for controlling said data communication means and said voice message communication means;
  control means for controlling said process means, and said data communication means and said voice message communication means in accordance with the programs of said memory,
  wherein said control means executes said data and voice message communication means controlling program in response to a detection signal from said detection means, and wherein upon receipt of the detection signal from said detection means during the execution of the process means controlling program, said control means alternately executes the process means controlling program and the data and voice message communication means controlling program so that said process means controlling program and said data and voice message communication means controlling program are executed in parallel.

2. A computer according to claim 1, wherein said voice message communication means comprises memory means storing a digitized voice message, and is adapted to read said digitized voice message from said memory means and to transmit said voice message to the communication line after conversion of said voice message into analog signals.

3. A computer according to claim 2, wherein said data communication means communicates data processed by said process means.

4. A computer according to claim 2, wherein said voice message communication means receives a voice message from the communication line and stores the received voice message in said memory means.

5. A computer according to claim 2, wherein said voice message communication means sends a voice message indicating an operation mode of said computer.

6. A computer according to claim 1, further comprising data recording means for recording the data received by said data communication means.

7. A personal computer according to claim 2, wherein said voice message are digitized by pulse code modulation.

8. A personal computer according to claim 2, wherein said voice message are digitized by adaptive differential pulse code modulation.

9. A computer according to claim 1, wherein said request for communication is a calling signal.

10. A computer comprising:
input means for entering data;
process means for processing the data from said input means;
communication means for effecting communication;
means for detecting a request for communication from a communication line;
a memory storing a program for controlling said process means and a program for controlling said communication means; and
control means for controlling said process means and said communication means in accordance with the programs of said memory;
wherein upon reception of a signal from said detection means during the execution of the process means controlling program, said control means alternately executes the process means controlling program and the communication means controlling program so that these two programs are executed in parallel.

11. A computer according to claim 10, wherein said control means is adapted to alternately execute a predetermined number of steps of the control program for said process means and a predetermined number of steps of the control program for said communication means.

12. A computer according to claim 10, wherein said process means is adapted to execute a document preparing process.

13. A computer according to claim 10, wherein said communication means is adapted to effect communication of acoustic message.

14. A computer according to claim 10, wherein said communication means is adapted to effect communication of image data.

* * * * *

UNITED STATES PATENT AND TRADEMARK OFFICE
CERTIFICATE OF CORRECTION

PATENT NO. : 4,916,607

DATED : April 10, 1990

INVENTOR(S) : Hiroo Teraichi et al.

It is certified that error appears in the above-identified patent and that said Letters Patent is hereby corrected as shown below:

Drawings:

FIGURE 3:

In step S1, "REQUET?" should read --REQUEST?--.

FIGURE 4:

In step M7, "ATHER" should read --ANOTHER--; and "MODES" should read --MODE--.

COLUMN 1:

Line 37, "favor" should read --favor of--.

Line 57, "automatic" should read --automatically--.

COLUMN 3:

Line 15, "predetere" should read --predeter- --.

Line 30, "signal" should read --signals--.

COLUMN 4:

Line 64, "predeteremined" should read --predetermined--.

UNITED STATES PATENT AND TRADEMARK OFFICE
CERTIFICATE OF CORRECTION

PATENT NO. : 4,916,607
DATED : April 10, 1990
INVENTOR(S) : Hiroo Teraichi et al.

It is certified that error appears in the above-identified patent and that said Letters Patent is hereby corrected as shown below:

<u>COLUMN 6</u>:

Line 30, "enables" should read --enable--.

Line 32, "enables" should read --enable--.

Line 50, "from" should read --for--.

<u>COLUMN 7</u>:

Line 24, "are" should read --is--.

Line 27, "are" should read --is--.

<u>COLUMN 8</u>:

Line 29, "acoustic" should read --an acoustic--.

Signed and Sealed this

Seventh Day of July, 1992

Attest:

DOUGLAS B. COMER

Attesting Officer     Acting Commissioner of Patents and Trademarks